(12) United States Patent
Liao et al.

(10) Patent No.: US 11,743,565 B1
(45) Date of Patent: Aug. 29, 2023

(54) COIL STRUCTURE OF CAMERA ACTUATORS

(71) Applicant: Apple Inc., Cupertino, CA (US)

(72) Inventors: Xiao Liao, Santa Clara, CA (US); Bin Xu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 39 days.

(21) Appl. No.: 17/485,108

(22) Filed: Sep. 24, 2021

(51) Int. Cl.
H04N 23/54 (2023.01)
H04N 23/55 (2023.01)
H04N 23/57 (2023.01)
H04N 23/68 (2023.01)

(52) U.S. Cl.
CPC ............ H04N 23/54 (2023.01); H04N 23/55 (2023.01); H04N 23/57 (2023.01); H04N 23/687 (2023.01)

(58) Field of Classification Search
CPC ..... H04N 523/54; H04N 523/57; H04N 23/55
See application file for complete search history.

(56) References Cited

U.S. PATENT DOCUMENTS 10,802,376 B2 10/2020 Sugawara
10,890,781 B2 1/2021 Zhang et al.
2020/0041756 A1* 2/2020 Kao .................... G02B 7/09
2020/0333623 A1 10/2020 Oh
2021/0185194 A1 6/2021 Park et al.
2021/0208475 A1* 7/2021 Park .................... G02B 7/08
2022/0191361 A1* 6/2022 Dai ..................... H02K 33/02
2022/0239808 A1* 7/2022 Jang .................... G03B 13/36
2022/0252961 A1* 8/2022 Park ................... H02K 11/215
2023/0038190 A1* 2/2023 Park ..................... H04N 23/55

FOREIGN PATENT DOCUMENTS

CN 112888999 A 6/2021

* cited by examiner

Primary Examiner — Amy R Hsu
(74) Attorney, Agent, or Firm — Robert C. Kowert; Kowert, Hood, Munyon, Rankin & Goetzel, P.C.

(57) ABSTRACT

A camera may use one or more actuators to implement various functions. An actuator of a camera may include one or more coil structures. The coil structure may include at least one layer of coil at a first side of a dielectric layer, and at least another one layer of coil at a second side of the dielectric layer opposite the first side. The coils at the two sides of the dielectric layers may have different numbers of turns. In particular, a section of the coil at the second side of the dielectric layer may be left out to cause the different numbers of turns between the coils at the two sides. The coil structure may also include one or more connection pads at the second side of the dielectric layer.

20 Claims, 7 Drawing Sheets

Top-view of a magnet

Top-view of a coil structure

Bottom-view of a coil structure

COIL STRUCTURE OF CAMERA ACTUATORS

BACKGROUND

Technical Field

This disclosure relates generally to a camera actuator and more specifically to a coil structure of a camera actuator.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. Some cameras may incorporate an optical image stabilization (OIS) mechanism that may sense and react to external excitation/disturbance by adjusting location of an image sensor relative to a lens of the camera in an attempt to compensate for unwanted motion of the lens. Furthermore, some cameras may incorporate an autofocus (AF) mechanism whereby the object focal distance can be adjusted to focus an object plane in front of the camera at an image plane to be captured by the image sensor. Generally, a camera may use an actuator to adjust the relative position between the lens and image sensor to implement the AF and/or OIS functions. Thus, design of camera actuators is vital to performance and quality of cameras.

Figure 1:
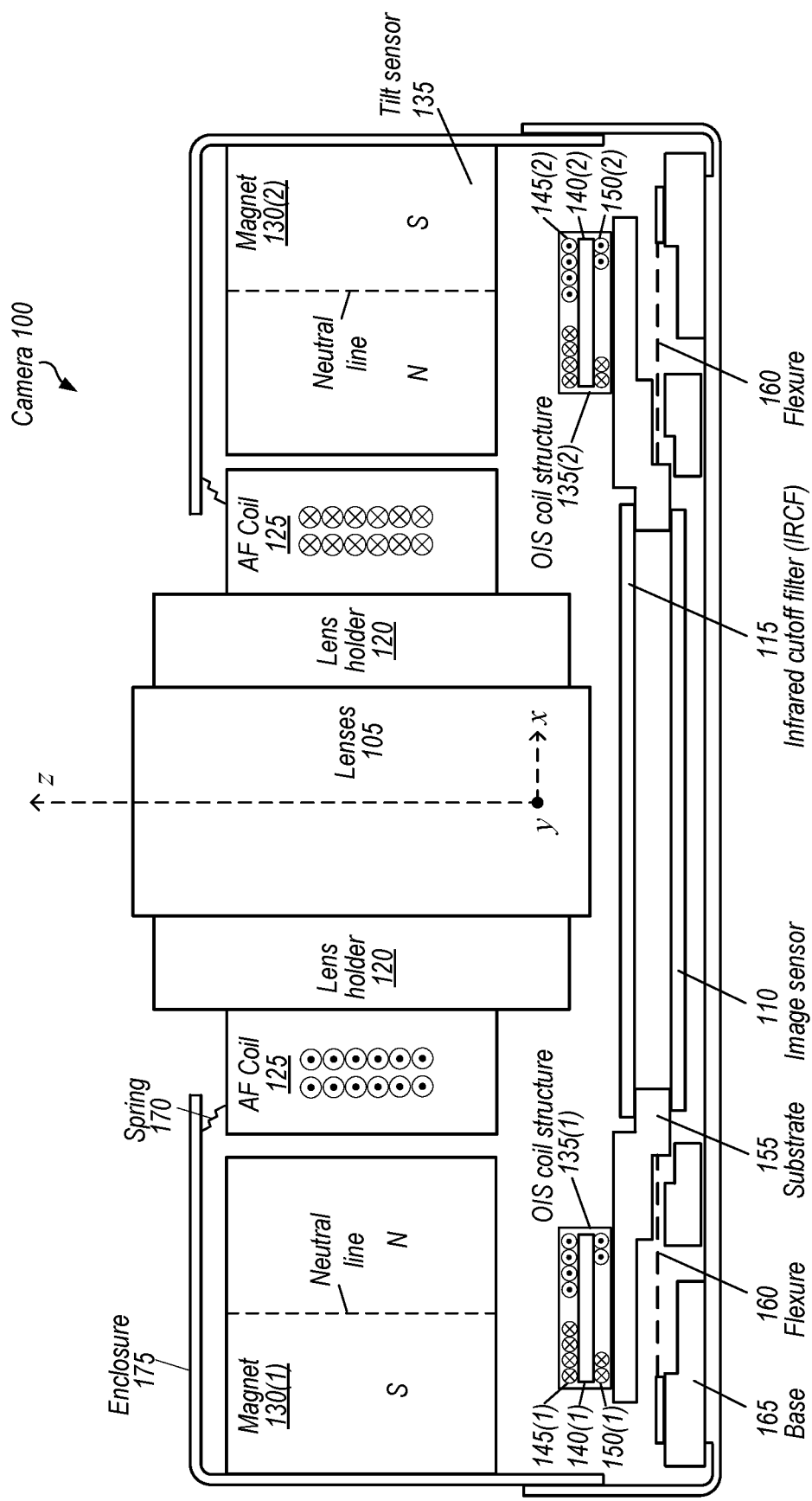
FIG. 1 shows an example camera with coil structure(s) disclosed herein, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or

DETAILED DESCRIPTION

Various embodiments described herein relate to a coil structure of camera actuators. In some embodiments, a camera may include one or more lenses, an image sensor, and one or more actuators. The lenses may pass through light from the environment of the camera to an image sensor. The image sensor may in turn generate signals from the light, such as electrical image signals. The signals may be further processed by a processor to produce one or more images. In some embodiments, the camera may use actuator(s) to adjust the relative position between the image sensor and the one or more lenses to perform various functions. For example, in some embodiments, the camera may use an actuator to move the image sensor relative to the lenses in one or more directions (e.g., X- and/or Y-axis) orthogonal to an optical axis of the lenses (or Z-axis). Such position adjustment may be used to implement an optical image stabilization (OIS) function to compensate for unwanted motion of the lenses with respect to the image sensor. In addition, in some embodiments, the camera may use an actuator to move the lenses relative to the image sensor to adjust the focal distance between the two to perform an autofocus (AF) function. In some embodiments, the OIS and AF functions may be implemented by moving either the image sensor or the lenses alone. For example, a camera may move either the image sensor (or the one or more lenses) in multiple directions (e.g., X and/or Y-axis, plus Z-axis) to perform both OIS and AF functions. In some embodiments, the camera described in the disclosure may be integrated as part of a multipurpose mobile device, such as a smartphone, table, pad device, etc.

In some embodiments, a camera may use a voice coil motor (VCM) to implement an actuator. In addition, the foregoing OIS and AF functions may be implemented using one single or separate actuators. When there are two separate actuators, the actuator used for the OIS function is also referred to as an OIS actuator, and the actuator used for the AF function is also referred to as an AF actuator, in this disclosure. In some embodiments, an actuator may include a set of one or more magnets and a set of one or more coils, e.g., a subset of one or more coils corresponding to one magnet. A power supply and driver circuit(s) may be used to drive current through the coils, which may interact with the magnetic field of the corresponding magnets to generate motive force (e.g., Lorentz force) to move component(s) (e.g., image sensor and/or lenses) of the camera.

In some embodiments, the actuator may include a coil structure for holding one or more coils. In some embodiments, the coil structure may include at least one layer of coil attached at a first side of a dielectric layer and at least another layer of coil attached at a second side of the dielectric layer that is opposite to the first side. Further, in some embodiments, the first side of the coil may be arranged facing or towards at least one magnet of the actuator. For purposes of illustration, this first side of the dielectric layer towards the magnet is also referred to as a top layer, while the (opposite) second side of the dielectric layer is also referred to as a bottom layer. However, the terms "top layer" and "bottom layer" are merely provided to simplify the description and may not necessarily refer to a specific spatial relationship. Depending on the orientation of the camera, in some embodiments, a top layer may not necessarily reside above a bottom layer. Moreover, when the actuator includes multiple magnets, the actuator may accordingly include multiple coil structures, where one coil structure may correspond to one magnet.

In some embodiments, the top-layer and bottom-layer coils of the actuator may have different number of turns. In particular, in some embodiments, one or more turns of the bottom-layer coil may be omitted compared to the top-layer coil, thus causing the different number of turns between the top-layer and bottom-layer coils. In some embodiments, the one or more turns of the bottom-layer coil that are left out are determined based on (a) the position of the one or more turns with respect to a neutral line of a corresponding magnet, and/or (b) the motive force (e.g., Lorentz force) generated by these turns of the bottom-layer coil if conducting current.

A neutral line of a magnet may refer to a line or plane at a right angle (e.g., 90°) to the magnetic field of the magnet. For example, when a magnet includes a north pole and a south pole, the neutral line may correspond approximately to the separate boundary between the north and south poles of the magnet. If the magnetic field of the magnet can be represented by magnetic flux emerging from the north pole and entering the south pole, a line or plane at this boundary is approximately perpendicular (e.g., 90° to the magnetic flux. As described below in detail, the motive force (e.g., the Lorentz force) generated by a current-conducting wire in the magnetic field of a magnet can be decomposed into two components upon two orthogonal axes, e.g., one approximately parallel with the neutral line of the magnet and another approximately orthogonal to the neutral line of the magnet. When the wire is proximate the neutral line of the magnet, the component in the axis parallel with the neutral line may be greater than the other component in the axis orthogonal to the neutral line.

In some embodiments, the arrangement of an actuator, e.g., the OIS actuator, may render the coils of the actuator to reside on a plane approximately orthogonal to an optical axis of the one or more lenses (e.g., Z-axis), and the neutral line of the corresponding magnet to be approximately parallel with the optical axis of the lenses (e.g., Z-axis). As a result, the motive force (e.g., Lorentz force) generated from the interaction between the coils and the magnet may be decomposed, as described above, into the components in one direction parallel to the optical axis (e.g., Z-axis) (e.g., parallel with the neutral line of the magnet) and another direction (e.g., X or Y-axis) orthogonal to the optical axis (e.g., orthogonal to the neutral line of the magnet). The closer a section of a coil is to the neutral line of the magnet, the larger the component in the direction parallel to the optical axis (e.g., Z-axis), and the less the component in another direction (X- or Y-axis) orthogonal to the optical axis. However, on the other side, in some embodiments, the desired function of the OIS actuator may be to move the image sensor relative to the lenses in one or more directions (e.g., X- and/or Y-axis) orthogonal to the optical axis of the lenses (e.g., Z-axis). Thus, the desired actuation force from the actuator is the force towards a direction (e.g., X- or Y-axis) orthogonal to the optical axis, but not in a direction parallel with the optical axis (e.g., Z-axis). Thus, in some embodiments, the one or more turns of the bottom-layer coil within an area proximate the neutral line of the corresponding magnet may be left out, as this section of the bottom-layer coil mainly contributes to the force with a large component in the direction parallel with the optical axis (e.g., Z-axis). In some embodiments, this area may correspond to an inner area surrounded by the bottom-layer coil.

In some embodiments, the coil structure may also include one or more connection pads (e.g., solder pads). The connection pads may be used for electrically connecting the coils at the coil structure to another part of the camera, e.g., for delivering power to the coil structure. In some embodiments, the connection pads may be designed for surface mount connections. As described above, since the one or more turns of the bottom-layer coil within the inner area at the bottom layer are omitted, the inner area may thus become readily available. As a result, in some embodiments, the one or more connection pads may be placed at the bottom layer within the inner area. This may avoid requirements for increasing the size of the dielectric layer or decreasing the size for the bottom-layer coil.

The coil structure in the disclosure provides at least several benefits. One, as described above, the section of the bottom-layer coil in the inner area may be positioned proximate the neutral line of the magnet. Thus, this section of the bottom-layer coil may primarily contribute to the force or component of force in the direction parallel to the optical axis of the lenses (e.g., Z-axis). However, in some embodiments, the desired direction of the actuation force of an actuator (e.g., the OIS actuator) may be in other direction(s) (e.g., X- and/or Y-axis) orthogonal to the optical axis. Thus, omission of this section of the bottom-layer coil may greatly reduce the disturbance force (in Z-axis) and its disturbance impact, without significant sacrifice to the desired actuation force (in X- and/or Y-axis). This may improve performance of the camera functions (e.g., the OIS function). Two, elimination of the one or more turns of the bottom-layer coil may also reduce resistance of the coil. As a result, at a given supply voltage, this may increase the current to the top-layer and bottom-layer coils and thus the actuation force. The increase of the actuation force may also improve response speed and performance of the camera functions (e.g., the OIS function). Three, in some embodiments, the coil structure may use a two-layer design, where the top and bottom layers of the dielectric layer may each have one single layer. Compared to other designs with more than two layers, the two-layer design may greatly simplify the coil structure design and manufacturing processes, and improve reliability of the coil structure and actuator. In addition, compared to the other more complicated structures, the two-layer coil structure may further reduce size (e.g., the thickness) of the coil structure. Moreover, with the two-layer design, coil surface warpage may be also reduced since the mass of the coils may be distributed more symmetrically between the two layers.

FIG. 1 shows an example camera with coil structures disclosed herein, according to some embodiments. For purposes of illustration, an optical coordinate system defined by X-Y-Z axes is displayed in FIG. 1, where an optical axis of one or more lenses of the camera may be defined as the Z-axis. In some embodiments, the optical axis (or Z-axis) may correspond to the transmission path of a principal light ray passing through the lenses to an image sensor of the camera. In some embodiments, the transmission path of the principal light ray within the camera may not necessarily be a straight but a folded line, e.g., when the camera includes a light folding element that may change the transmission direction of the principal light ray. In that case, the optical axis may refer to a straight portion of the folded line. Further, for purposes of illustration, only relevant components of the camera are shown in FIG. 1.

FIG. 1 shows a cross-sectional view of camera 100. In some embodiments, camera 100 may include one or more lenses 105 and image sensor 110. Lenses 105 may pass through light from an external environment of camera 100 to image sensor 110. In turn, image sensor 110 may generate signals from the light, e.g., electrical image signals. The signals may be further processed by a processor to produce an image. In some embodiments, camera 100 may further include infrared cutoff filter (IRCF) 115, placed optically between lenses 105 and image sensor 110. IRCF 115 may block infrared light from reaching image sensor 110 to improve the image quality produced by camera 100.

In some embodiments, camera 100 may use lens holder 120 to hold lenses 105. For example, in some embodiments, lens holder 120 may have inside threads, and lenses 105 may screw into the threads to become affixed to lens holder 120. In some embodiments, image sensor 110 and IRCF 115 may be mounted to substrate 155. As indicated in FIG. 1, the mounting of image sensor 110 and IRCF 115 may employ a flip-chip configuration, where image sensor 110 and IRCF 115 may be attached at two opposite sides of substrate 155. In some embodiments, substrate 155 may include an organic or ceramic printed circuit board (PCB).

As described above, in some embodiments, lenses 105 and/or image sensor 100 may be movable for performing AF and/or OIS functions. For example, in FIG. 1, camera 100 may include AF coil 125 that may be further attached with lens holder 120. Thus, lenses 105, lens holder 120, and AF coil 125 may be considered as "one" rigid body as they may move altogether. In some embodiments, camera 100 may use one or more springs 170 to suspend the one rigid body from a stationary part of camera 100, e.g., enclosure 175 of camera 100. As a result, lenses 105, lens holder 120, and AF coil 125 may become floated with respect to the stationary part of camera 100. Thus, camera 100 may use an AF actuator to move the lenses 105 with respect to image sensor 100 approximately in the direction parallel with the optical axis of lenses 105 (e.g., Z-axis). This movement may adjust the focal distance between lenses 105 and image sensor 110 and thus implement an AF function. As indicated in FIG. 1, in some embodiments, the AF actuator of camera 100 may include AF coil 125 and one or more magnets 130. As described above, AF coil 125 may be affixed with lenses 105 through lens holder 120, and magnets 130 may be attached with a stationary part of camera 100, e.g., enclosure 175, according to some embodiments. As indicated in FIG. 1, AF coil 125 may be arranged to allow current to flow approximately in the X-Y plane. For example, in FIG. 1, the circle with dot means current flowing out of the paper, and the circle with cross means current going into the paper. For purposes of illustration, FIG. 1 shows two magnets 130(1) and 130(2), and uses letters "N" and "S" to denote the north pole and south pole. Thus, when conducting current, the current of AF coil 125 may interact with the magnetic field of magnets 130 to generate motive force (e.g., Lorentz force) along the optical axis (e.g., Z-axis) to move lenses 105 relative to image sensor 110 in the direction to perform the AF function. By regulating the value and polarity of the current of AF coil 125, the motive force and thus movement of lenses 105 may be controlled.

In some embodiments, image sensor 110 may be also movable. For example, in FIG. 1, camera 100 may use flexure 160 to suspend substrate 155 (and thus image sensor 110) from a stationary part of camera 100, e.g., stationary base 165. Further, camera 100 may include an OIS actuator to implement the movement of image sensor 110. As indicated in FIG. 1, the OIS actuator may include one or more coil structures 135 that include at least one layer of coil 145 attached at a first side of dielectric layer 140 and at least another one layer of coil 150 attached at a second side of dielectric layer 140 opposite the first layer. Thus, in this example, the AF actuator and the OIS actuator may share the same set of magnets 130. Note that in FIG. 1, there are two magnets 130(1) and 130(2), and two coil structures 135(1) and 135(2), where one coil structure may correspond to one magnet. Given the arrangement of coil structures 135 and magnets 130 in FIG. 1, when conducting current, the current of coils 145 and 150 may interact with the magnetic field of magnets 130 to generate motive force (e.g., Lorentz force) to move image sensor 110 relative to lenses 105 in one or more direction (e.g., X- and/or Y-axis) orthogonal to the optical axis of lenses 105 (e.g., Z-axis), thus implementing the OIS function. Similarly, by adjusting the value and polarity of the current of coils 145 and 150, the motive force and thus movement of image sensor 110 may thus be controlled.

As indicated in FIG. 1, in some embodiments, the first side of dielectric layer 140 may be towards or face magnet 130. Thus, for purposes of illustration, coil 145 is also referred to as the top-layer coil, and coil 150 at the (opposite) second side of dielectric layer 140 is also referred to as the bottom-layer coil. In some embodiments, top-layer coil 145 and bottom-layer coil 150 may have different number of turns. For example, as indicated in FIG. 1, in some embodiments, one or more turns of bottom-layer 150 within an area proximate the neutral line of magnet 130(1) may be left out or omitted. In some embodiments, this area may refer to an inner area at the second side of dielectric layer 140, as it is inside and surrounded by bottom-layer 150 as indicated in FIG. 1. As described below in detail, this section of bottom-layer coil 150 may primarily contribute to motive force with a larger component in the direction parallel to the optical axis (e.g., Z-axis), but a less component in another directions (e.g., X- or Y-axis) orthogonal to the optical axis (e.g., Z-axis). Thus, elimination of the one or more turns of bottom-layer coil 150 at the inner area may reduce the disturbance force, but without significant sacrifice impact on the actuation force.

Note that FIG. 1 and other figures in the disclosure are provided merely as examples for purposes of illustration. Thus, they shall not limit the scope of the disclosure. For example, FIG. 1 displays coil structure 135 as a two-layer printed circuit board coil structure, where top-layer coil 145 and bottom-layer coil 150 respectively include only one single layer of coil. However, in some embodiments, coil structure 135 may have multiple layers of coil at the top and/or bottom layers. When coil structure 135 includes multiple layers of coil at a side of the dielectric layer, the multiple layers may be arranged to stack one layer on top of another. Similarly, though in this disclosure the coil structure is mainly discussed with respect to the OIS actuator, the concept may be similarly applied to the AF actuator as well.

Figure 2:
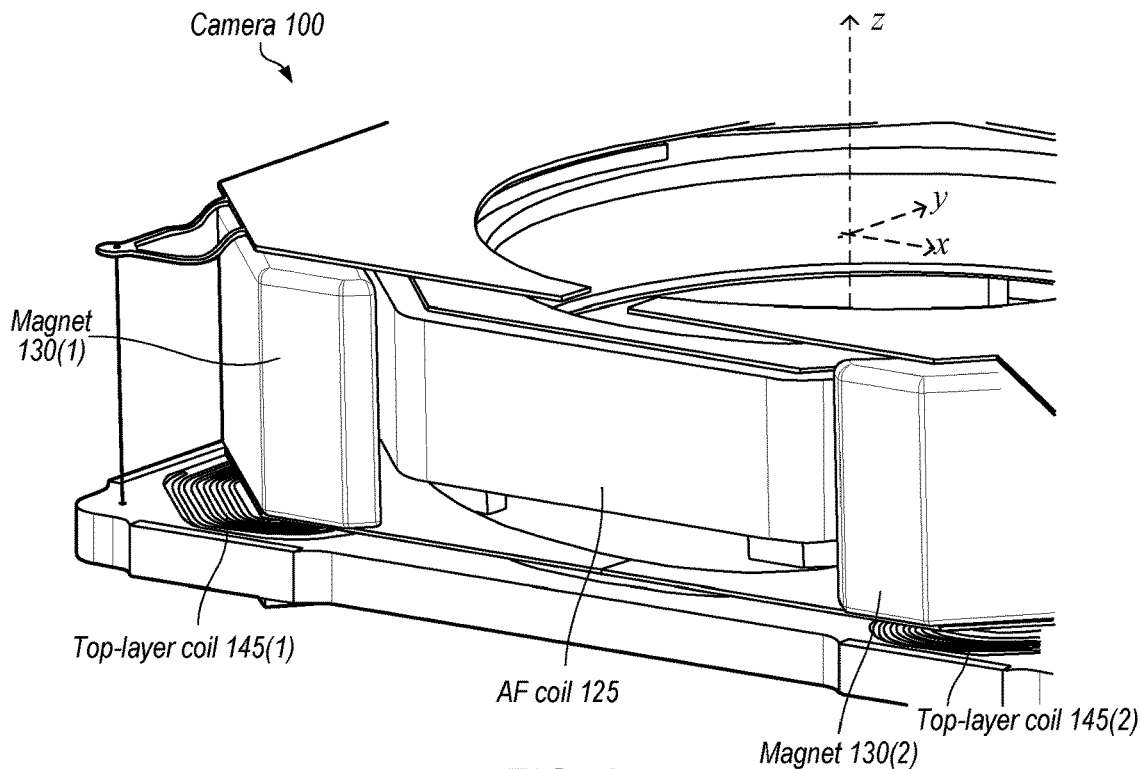
FIG. 2 shows a perspective view of an example camera, according to some embodiments.
Figure 3:
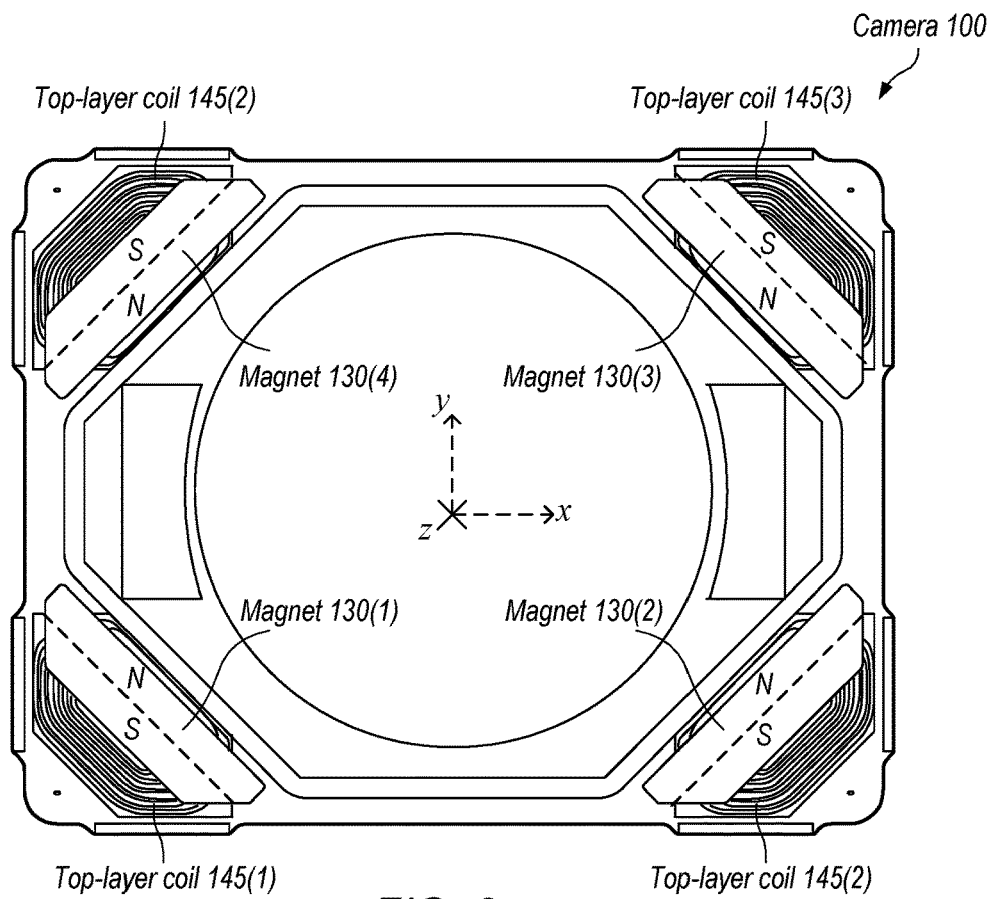
FIG. 3 shows a top view of an example camera, according to some embodiments.

FIGS. 2 and 3 show respectively perspective view and top view of camera 100, according to some embodiments. As they correspond to outside views of the camera, not all the components of camera 100 in FIG. 1 are visible in the figures. For example, in FIGS. 2-3, top-layer coils 145 are displayed, but bottom-layer coils 150 at the opposite side of the dielectric layers are not visible. As indicated in FIGS. 2-3, in some embodiments, camera 100 may include four magnets 130(1), 130(2), 130(3), and 130(4) placed at four corners on the periphery of the camera. In addition, in some embodiments, with respect to each magnet, camera 100 may include a coil structure (e.g., like coil structures 135(1) and 135(2) in FIG. 1) that may include at least one layer of coil (e.g., like top-layer coils 145(1) and 145(2) in FIG. 1) at one side of a dielectric layer (e.g., like dielectric layers 140(1) and 140(2) in FIG. 1) and at least another one layer of coil (e.g., like bottom-layer coils 150(1) and 150(2) in FIG. 1) at the opposite side of the dielectric layer. As described above, in some embodiments, the top-layer and bottom-layer coils may operate with the magnets to implement the OIS function for camera 100.

Figure 4:
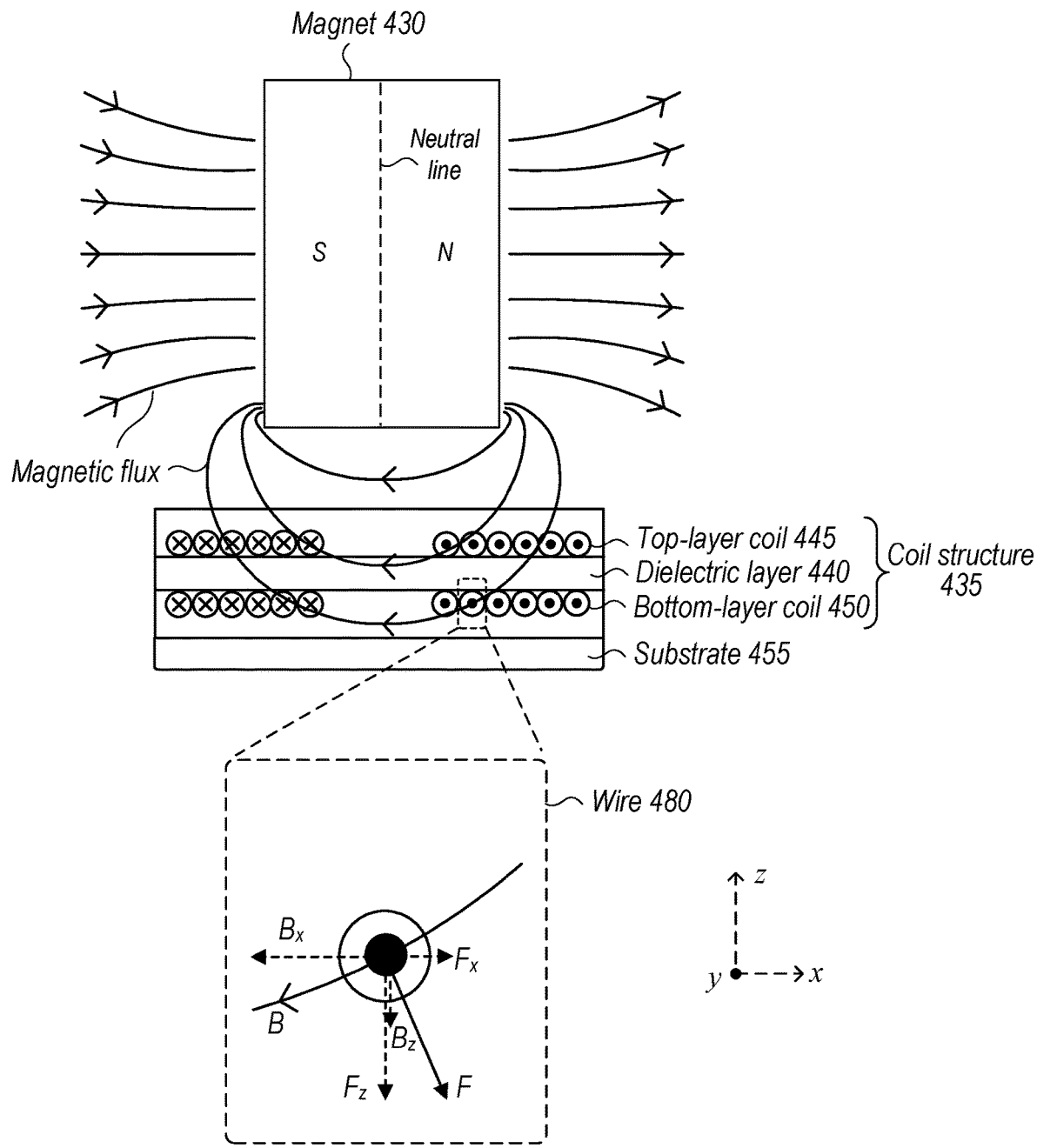
FIG. 4 shows the motive force and decomposed components generated from an interaction of a coil and a magnet, according to some embodiments.

FIG. 4 shows the motive force and decomposed components generated from an interaction of a coil and a magnet, according to some embodiments. In FIG. 4, coil structure 435 (e.g., like coil structure 135 in FIGS. 1-3) may be placed within the magnetic field of magnet 430 (e.g., like magnet 130 in FIGS. 1-3. For purposes of illustration, the magnetic field of magnet 430 is represented by the magnetic flux emerging from the north pole of magnet 430 and entering the south pole of magnet 430. As indicated in FIG. 4, in some embodiments, coil structure 435 may include at least one layer of coil 445 (also referred to as a top-layer coil, like bottom-layer coil 150 in FIGS. 1-3) at a first side of dielectric layer 440 (e.g., like dielectric layer 140 in FIGS. 1-3) facing magnet 430, and at least another layer of coil 450 (also referred to as a bottom-layer coil, like bottom-layer coil 450 in FIGS. 1-3) at a second side of dielectric layer 440 opposite the first side. Further, in some embodiments, coil structure 435 may be attached to substrate 455 (e.g., like substrate 155 in FIGS. 1-3). Note that for purposes of illustration, in FIG. 4, top-layer coil 445 and bottom-layer coil 450 are displayed to have the same number of turns. In other words, in FIG. 4, the one or more turns of bottom-layer coil 450 have not yet excluded in order to show the motive force and decomposed components generated from this section of bottom-layer coil 450.

To demonstrate the motive force and decomposed components, a zoomed view of wire 480 of bottom-layer coil 450 is displayed in FIG. 4. As indicted in the figure, wire 480 may be positioned at an inner area at the bottom side of dielectric layer 440 that is proximate the neutral line of magnet 430. In the zoomed view, the magnetic field B of magnet 430 may be decomposed into two components $B_z$ and $B_x$ in Z-axis and X-axis. Given that the direction of the current of wire 480 is out of the paper (e.g., represented by a circle with dot), the current of wire 480 may interact with the components $B_z$ and $B_x$ of magnetic field B of magnet 430 to generate motive force F (e.g., Lorentz force) with respective components $F_x$ and $F_z$. Assuming that Z-axis corresponds to the optical axis of one or more lenses of a camera (as described above), the force component $F_z$ is then in the direction parallel with the optical axis, and force component $F_x$ is in the direction orthogonal to the optical axis. In other words, if coil structure 435 is part of an OIS actuator, the force component $F_x$ would be the desired actuation force as it may move an image sensor in a desired direction, while the force component $F_z$ is the disturbance force. Moreover, in FIG. 4, as wire 480 moves further left in the inner are to become closer to the neutral line of magnet 430, force component $F_z$ may become larger, and the force component $F_x$ may become less. Thus, the section of bottom-layer coil 450 within the inner area proximate the neutral line of magnet 430 may be considered least effective in generation of the actuation force for the actuator. As a result, omission of this section from the bottom-layer coil 450 may greatly reduce the force component along Z-axis (e.g., the disturbance force), without significant sacrifice or impact on the force component along X- or Y-axis (e.g., the actuation force). In some embodiments, a two-layer coil structure as disclosed herein may reduce the force component $F_z$ by more than 50% with almost the same force component $F_x$.

Figure 5:
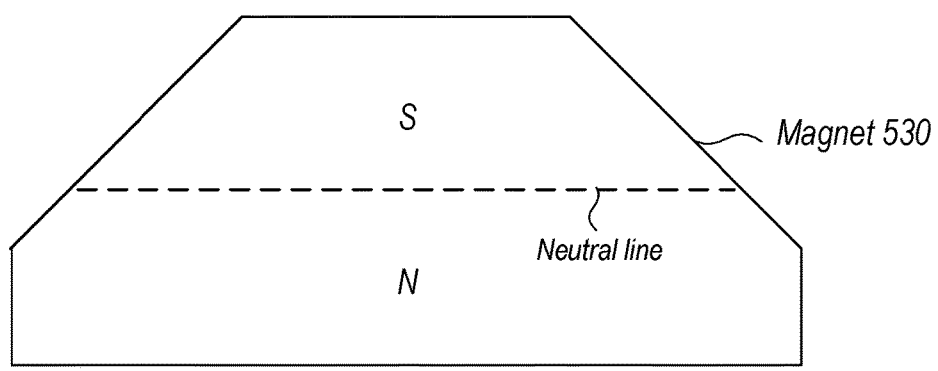
FIG. 5 shows top view and bottom view of an example coil structure of a camera, according to some embodiments.
Figure 5:
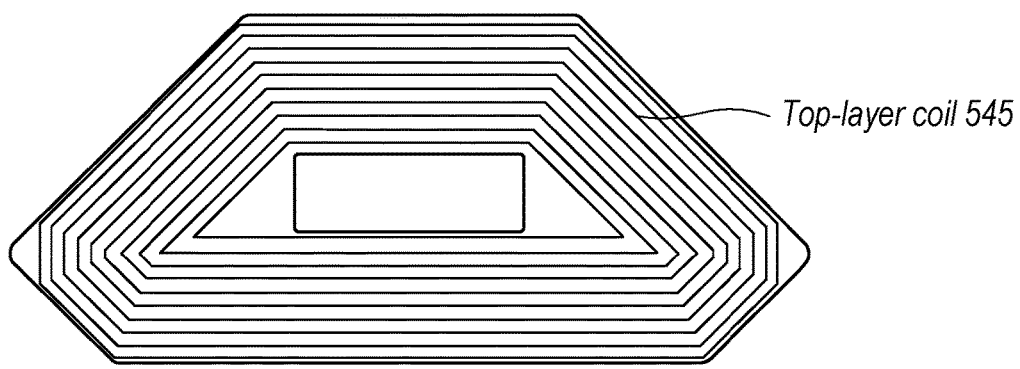
Figure 5:
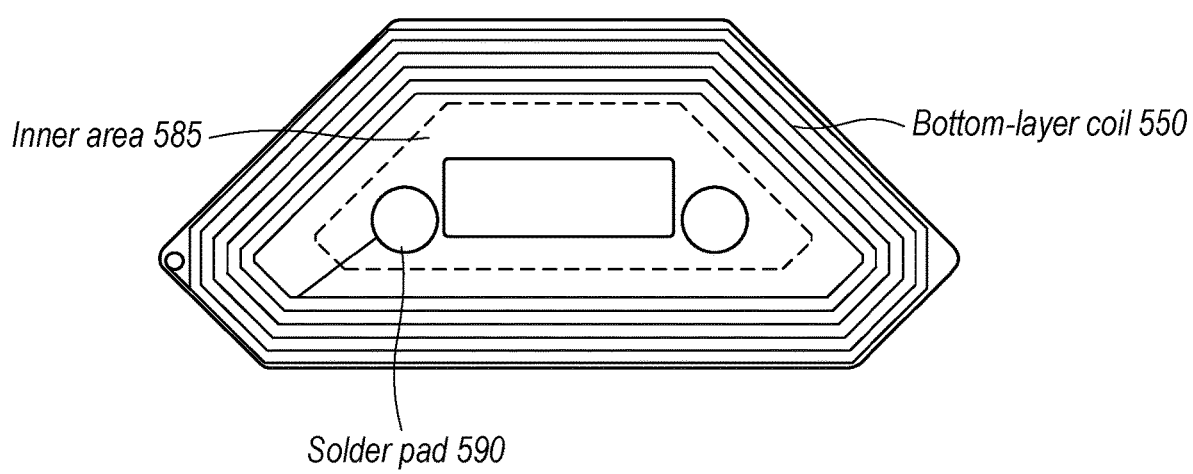

FIG. 5 shows top and bottom views of an example coil structure of a camera, according to some embodiments. As indicated in FIG. 5, in some embodiments, coil structure 535 (e.g., like the coil structures in FIGS. 1-4) may include at least one layer of coil, e.g., top-layer coil 545, at a first side of a dielectric layer facing magnet 530. In addition, in some embodiments, at a second side of the dielectric layer that is opposite to the first side, coil structure 535 may include at least another one layer of coil, e.g., bottom-layer coil 550. Further, in some embodiments, top-layer coil 545 and bottom-layer coil 550 may have different numbers of turn. For example, in some embodiments, one or more turns of bottom-layer coil 550 may be eliminated compared to top-layer coil 545. In some embodiments, the one or more turns of bottom-layer coil 550 that are eliminated may be determined based on (a) the position of the one or more turns with respect to a neutral line of a corresponding magnet (e.g., magnet 530), and/or (b) the motive force (e.g., Lorentz force) generated by these turns of the bottom-layer coil if conducting current. For example, as indicated in FIG. 5, in some embodiments, the one or more turns of bottom-layer coil 540 that are eliminated may reside within inner area 585 that is proximate the neutral line of magnet 530. In addition, in some embodiments, inner area 585 may be an inside area of the bottom layer of coil structure 535 that is encircled by bottom-layer coil 550. Further, in some embodiments, the motive force (e.g., Lorentz force) generated by the one or more turns of bottom-layer coil 540, when conducting current, may have a larger component in a direction parallel with an optical axis of one or more lenses of a camera, and a less component in another direction orthogonal to the optical axis.

Moreover, as indicted in FIG. 5, in some embodiments, coil structure 535 may also include one or more connection pads 590. In some embodiments, connection pads 590 may be used for connecting coil structure 535 with another part of the camera. For example, in some embodiments, connection pads 590 may be used to connect coil structure 535 with a substrate (e.g., substrate 155 in FIG. 1), through which electric traces may be routed for delivering power to top-layer coil 545 and bottom-layer coil 550. In some embodiments, connection pads 590 may be designed for surface mount connections. In some embodiments, connection pads 590 may be placed within inner area 585, as this area becomes readily available after omission of the one or more turns of bottom-layer coil 550. Note that, for purposes of illustration, in this example in FIG. 5, magnet 530, top-layer coil 545, and bottom-layer coil 550 are displayed in irregular, trapezoid-like shapes. However, the coil structure disclosed herein may be similarly applied to magnet(s) and/or coil(s) in various geometric shapes.

Figure 6:
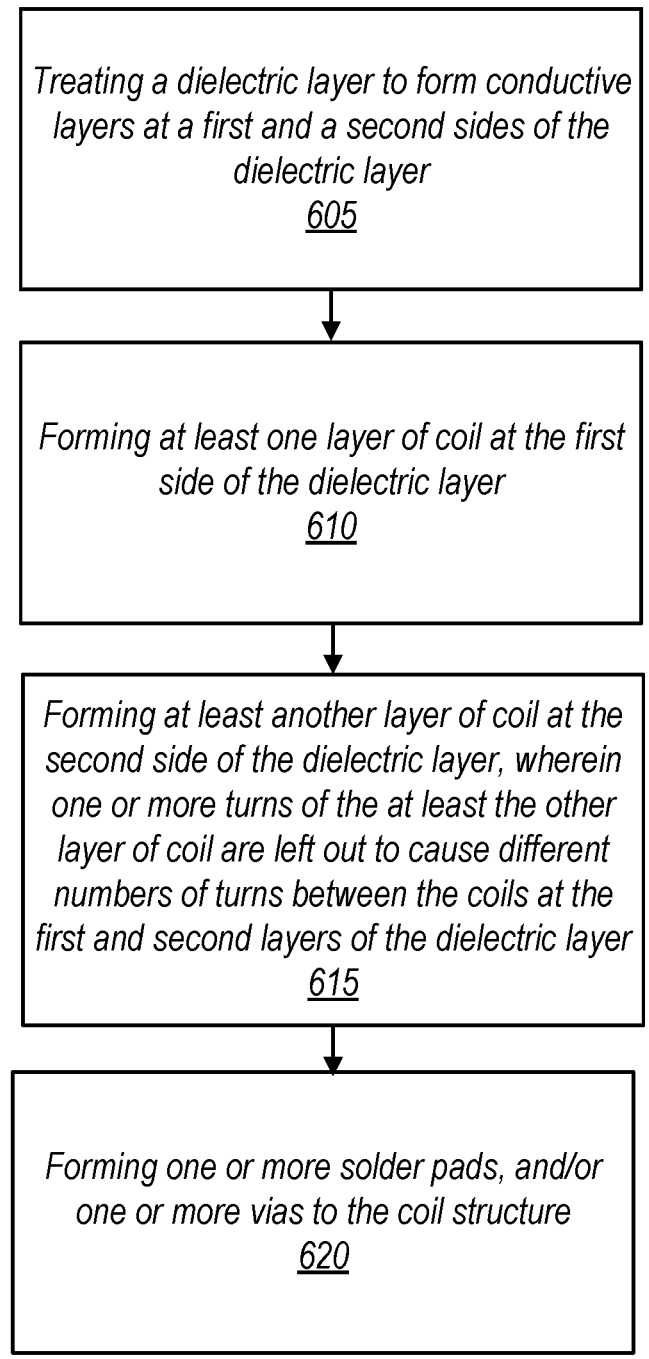
FIG. 6 is a simplified flowchart illustrating a method for making a coil structure, according to some embodiments.

FIG. 6 is a simplified flowchart illustrating a method for making a coil structure, according to some embodiments. In some embodiments, a dielectric layer (e.g., like the dielectric layer in FIGS. 1-5) may be treated to form conductive layers at a first and a second sides of the dielectric layer (block 605). In some embodiments, the dielectric layer may be implemented using a rigid or flexible printed circuit board (PCB), e.g., made from epoxy resin, fiber glass, ajinomato build-up film, etc. In some embodiments, the first and second sides of the dielectric layer are opposite to each other.

In some embodiments, at least one layer of coil (e.g., like the top-layer coil in FIGS. 1-5) may be formed at the first side of the dielectric layer (block 610). In some embodiments, formation of the at least one layer of coil may involve one or more lithography and etching processes. For example, in some embodiments, a lithography process may be applied to print a winding pattern of the coil at the first side of the dielectric layer. Next, an etching process may be applied to etch away part of the conductive layer at the first side of the dielectric layer to form the coil. When the coil includes multiple layers, the foregoing processes may then be repeated. For example, another dielectric layer may be applied to cover the previous-formed layer of coil, and then another conductive layer may be added over this newly-formed dielectric layer. Next, the lithography and etching processes may be repeated to form another layer of coil. As a result, the multiple layers may be stacked on top of each other.

In addition, in some embodiments, at least another one layer of coil (e.g., like the bottom-layer coil in FIGS. 1-5) may be formed at the second side of the dielectric layer (block 615). Similarly, in some embodiments, formation of the at least the other one layer of coil may also involve one or more lithography and etching processes, as described above regarding the coil at the first side of the dielectric layer. In some embodiments, the coils at the first and second sides of the dielectric layers may be formed during the same lithography and etching processes, or separately in different processes. As described above, in some embodiments, one or more turns of the at least the other layer of coil at the second side of the dielectric layer. In some embodiments, the one or more turns may be determined based on (a) the position of the one or more turns with respect to a neutral line of a corresponding magnet, and/or (b) the motive force (e.g., Lorentz force) generated by these turns of the bottom-layer coil if conducting current. In some embodiments, the one or more turns may reside within an inner area at the second side of the dielectric layer that is surrounded by the at least the other one layer of coil.

In some embodiments, one or more connection pads (e.g., like connection pads 585 in FIG. 5) may be formed at the second side of the dielectric layer (block 620). As described above, in some embodiments, the connection pads may be for surface mount connections, and they may be placed within an inner area at the second side surrounded by the at least the other layer of coil at the second side of the dielectric layer. Further, in some embodiments, one or more vias may be formed through the body of the dielectric layer to electrically connect the coils at the first and second sides of the dielectric layer (block 620). In other words, in some embodiments, the coils at the two sides of the dielectric layer may be formed as one integral coil (e.g., using vias). However, in some embodiments, the coils at the two opposite sides may include separate and isolated coils. In some embodiments, protective coating may be also applied to cover the coils at both sides of the dielectric layer. As needed, the coil structure may be further connected to another component, e.g., a substrate of a camera as described above.

Figure 7:
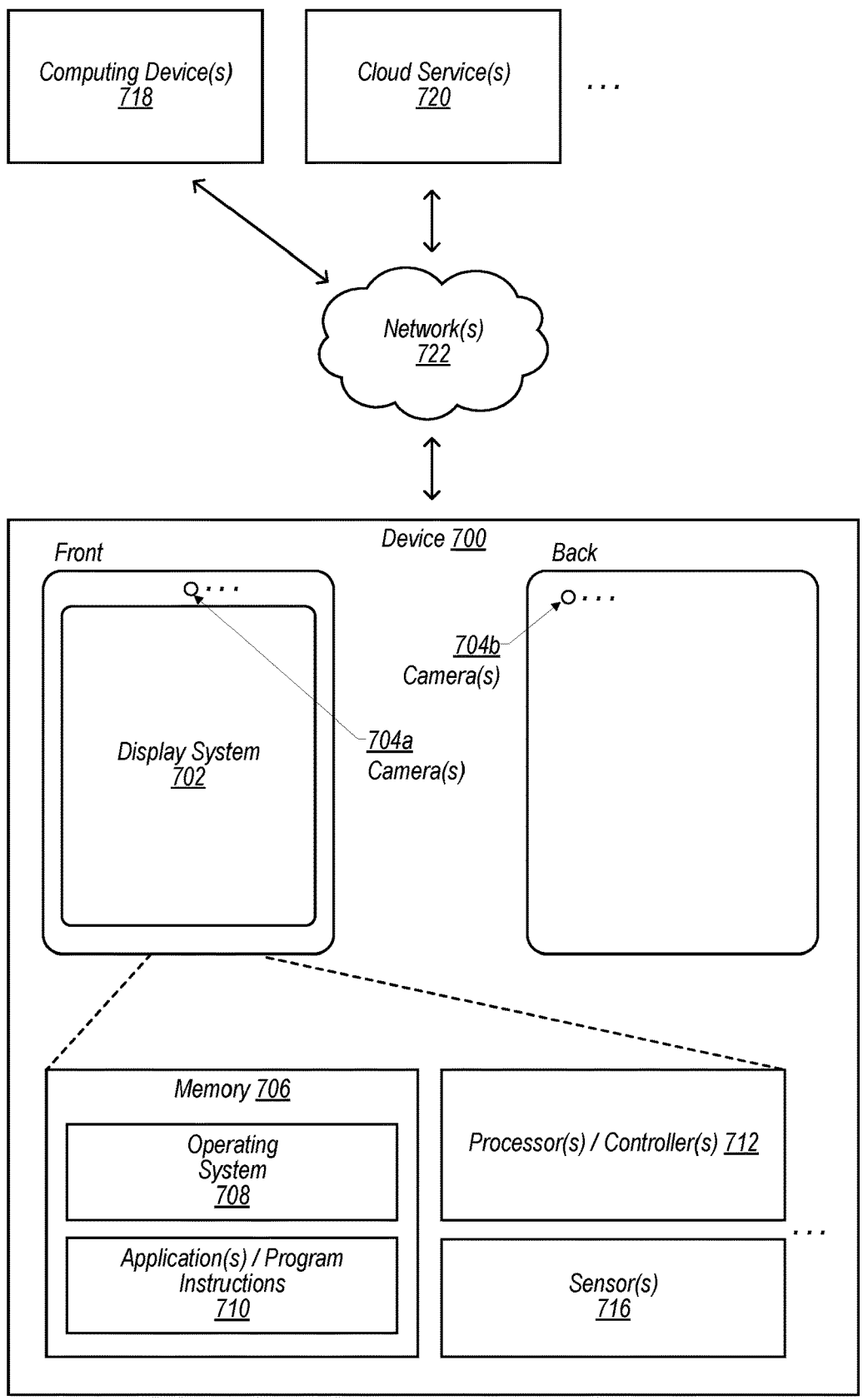
FIG. 7 shows a schematic representation of an example device that may include a camera having coil structure(s) disclosed here, according to some embodiments.

FIG. 7 illustrates a schematic representation of an example device 700 that may include a camera having coil structure(s), e.g., as described herein with reference to FIGS. 1-6, according to some embodiments. In some embodiments, the device 700 may be a mobile device and/or a multifunction device. In various embodiments, the device 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 700 may include a display system 702 (e.g., comprising a display and/or a touch-sensitive surface) and/or one or more cameras 704. In some non-limiting embodiments, the display system 702 and/or one or more front-facing cameras 704*a* may be provided at a front side of the device 700, e.g., as indicated in FIG. 7. Additionally, or alternatively, one or more rear-facing cameras 704*b* may be provided at a rear side of the device 700. In some embodiments comprising multiple cameras 704, some or all of the cameras may be the same as, or similar to, each other. Additionally, or alternatively, some or all of the cameras may be different from each other. In various embodiments, the location(s) and/or arrangement(s) of the camera(s) 704 may be different than those indicated in FIG. 7.

Among other things, the device 700 may include memory 706 (e.g., comprising an operating system 708 and/or application(s)/program instructions 710), one or more processors and/or controllers 712 (e.g., comprising CPU(s), memory controller(s), display controller(s), and/or camera controller(s), etc.), and/or one or more sensors 716 (e.g., orientation sensor(s), proximity sensor(s), and/or position sensor(s), etc.). In some embodiments, the device 700 may communicate with one or more other devices and/or services, such as computing device(s) 718, cloud service(s) 720, etc., via one or more networks 722. For example, the device 700 may include a network interface (e.g., network interface 810) that enables the device 700 to transmit data to, and receive data from, the network(s) 722. Additionally, or alternatively, the device 700 may be capable of communicating with other devices via wireless communication using any of a variety of communications standards, protocols, and/or technologies.

Figure 8:
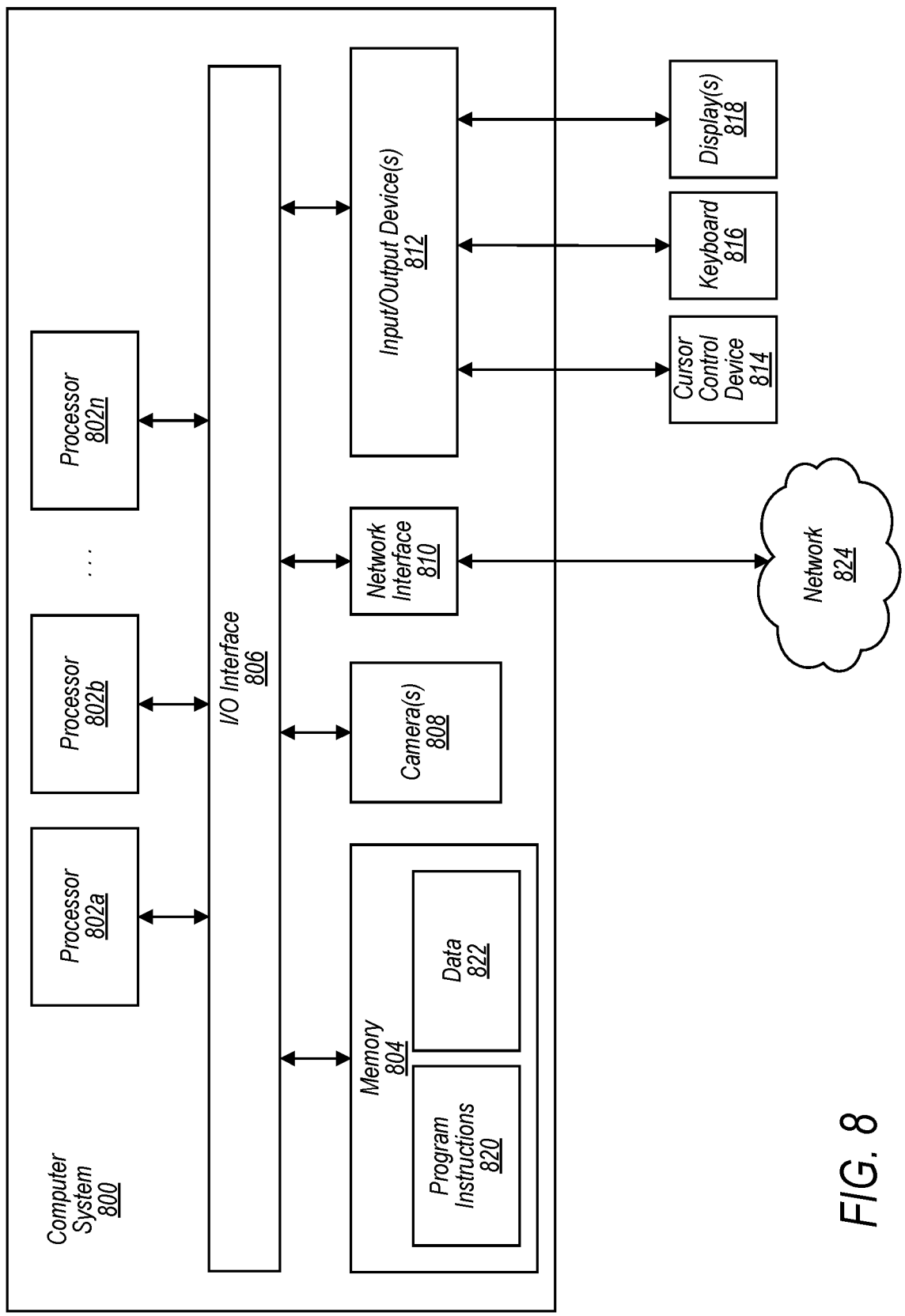
FIG. 8 shows a schematic block diagram of an example computer system that may include a camera having coil structure(s) disclosed herein, according to some embodiments.

FIG. 8 illustrates a schematic block diagram of an example computing device, referred to as computer system 800, that may include or host embodiments of a camera having coil structure(s), e.g., as described herein with reference to FIGS. 1-7, according to some embodiments. In addition, computer system 800 may implement methods for controlling operations of the camera and/or for performing image processing images captured with the camera. In some embodiments, the device 700 (described herein with reference to FIG. 7) may additionally, or alternatively, include some or all of the functional components of the computer system 800 described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more cameras 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 802 may include additional types of processors, such as graphics processing units (GPUs), application specific integrated circuits (ASICs), etc. In multiprocessor systems, each of processors 802 may commonly, but not necessarily, implement the same ISA. In some embodiments, computer system 800 may be implemented as a system on a chip (SoC). For example, in some embodiments, processors 802, memory 804, I/O interface 806 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   one or more lenses;
   an image sensor configured to receive light from the one or more lenses; and
   an actuator configured to move at least one of the lenses or the image sensor, wherein the actuator comprises:
   at least one magnet;
   at least one layer of coil at a first side of a dielectric layer facing the at least one magnet; and
   at least another one layer of coil at a second side of the dielectric layer opposite the first side,
   wherein the at least one layer of coil at the first side of the dielectric layer includes a number of turns that is different from the at least the other one layer of coil at the second side of the dielectric layer.

2. The system of claim 1, wherein compared to the at least one layer of coil at the first side of the dielectric layer, one or more turns of the at least the other one layer of coil within an area at the second side of the dielectric layer surrounded by the at least the other one layer of coil are eliminated to cause the different numbers of turns between the coils at the first and second sides of the dielectric layer.

3. The system of claim 2, wherein the one or more turns of the at least the other one layer of coil at the second side of the electric layer are identified based on at least one of (a)

a position of the area at the second side relative to a neutral line of the at least one magnet or (b) force generated from interaction with the at least one magnet when conducting current, and wherein the force generated by the one or more turns when conducting current includes a larger component in a direction parallel with an optical axis of the one or more lenses and a less component in another direction orthogonal to the optical axis of the one or more lenses.

4. The system of claim 1, wherein the actuator further comprises one or more connection pads at the second side of the dielectric layer for electrically connecting the coils to another component.

5. The system of claim 4, wherein the one or more connection pads are placed within an area at the second side of the dielectric layer that is surrounded by the at least the other one layer of coil.

6. The system of claim 4, wherein the one or more connection pads are for surface mount connections.

7. The system of claim 1, wherein the actuator is configured to conduct current through the coils at the first and second sides of the dielectric layer to interact with a magnetic field of the at least one magnet to generate force to move the image sensor relative to the one or more lenses in one or more directions.

8. A device, comprising:
one or more lenses;
an image sensor configured to generate signals based on light passing through the one or more lenses;
a processor configured to process the signals from the image sensor to generate an image; and
an actuator configured to move at least one of the lenses or the image sensor, wherein the actuator comprises:
at least one magnet;
at least one layer of coil at a first side of a dielectric layer towards the at least one magnet; and
at least another one layer of coil at a second side of the dielectric layer opposite the first side,
wherein the at least one layer of coil at the first side of the dielectric layer includes a number of turns that is different from the at least the other one layer of coil at the second side of the dielectric layer.

9. The device of claim 8, wherein compared to the at least one layer of coil at the first side of the dielectric layer, one or more turns of the at least the other one layer of coil within an area at the second side of the dielectric layer surrounded by the at least the other one layer of coil are eliminated to cause the different numbers of turns between the coils at the first and second sides of the dielectric layer.

10. The device of claim 9, wherein the one or more turns of the at least the other one layer of coil at the second side of the electric layer are identified based on at least one of (a) a position of the area at the second side relative to a neutral line of the at least one magnet or (b) force generated from interaction with the at least one magnet when conducting current, and wherein the force generated by the one or more turns when conducting current includes a larger component in a direction parallel with an optical axis of the one or more lenses and a less component in another direction orthogonal to the optical axis of the one or more lenses.

11. The device of claim 8, wherein the actuator further comprises one or more connection pads at the second side of the dielectric layer for electrically connecting the coils to another component.

12. The device of claim 11, wherein the one or more connection pads are placed within an area at the second side of the dielectric layer that is surrounded by the at least the other one layer of coil.

13. The device of claim 11, wherein the one or more connection pads are for surface mount connections.

14. The device of claim 8, wherein the actuator is configured to conduct current through the coils at the first and second sides of the dielectric layer to generate force to move the image sensor relative to the one or more lenses in one or more directions.

15. A camera, comprising:
one or more lenses;
an image sensor configured to receive light from the one or more lenses; and
actuator configured to move at least one of the lenses or the image sensor, wherein the actuator comprises:
at least one magnet; and
at least one two-layer printed circuit board coil structure for a coil, wherein the two-layer printed circuit board coil structure has:
a top coil layer facing the at least one magnet and including a first plurality of turns of the coil; and
a bottom coil layer including a second plurality of turns of the coil and connection pads for electrically connecting the coil to another component.

16. The camera of claim 15, wherein the connection pads are placed within an area surrounded by the second plurality of turns of the coil.

17. The camera of claim 16, wherein the area is proximate a neutral line of the at least one magnet compared to other areas of the bottom coil layer.

18. The camera of claim 16, wherein the top coil layer and bottom coil layer have different numbers of turns.

19. The camera of claim 18, wherein one or more turns of the coil at the bottom coil layer are omitted compared to the top coil layer to cause the different numbers of turns between the top coil layer and the bottom coil layer.

20. The camera of claim 15, wherein the actuator is configured to conduct current through the coil at the top coil layer and bottom coil layer of the two-layer printed circuit board coil structure to generate force to move the image sensor relative to the one or more lenses in one or more directions.

* * * * *